United States Patent [19]

Hinds

[11] 4,273,305
[45] Jun. 16, 1981

[54] SATELLITE SERVICING

[75] Inventor: Charles M. Hinds, Weston, Canada

[73] Assignee: Spar Aerospace Limited, Toronto, Canada

[21] Appl. No.: 54,829

[22] Filed: Jul. 3, 1979

[51] Int. Cl.$^3$ .............................................. B64G 1/14
[52] U.S. Cl. .............................. 244/158 R; 244/160; 244/162
[58] Field of Search .............. 244/158, 159, 160, 161, 244/162; 294/86 R

[56] References Cited

U.S. PATENT DOCUMENTS

4,079,904   3/1978   Groskopfs et al. .................. 244/161

Primary Examiner—Charles E. Frankfort
Attorney, Agent, or Firm—Fetherstonhaugh & Co.

[57] ABSTRACT

This invention relates to an improved satellite servicing system. The improvements include improvements in payload distribution in the cargo bay of the Shuttle Orbiter and improvements in the location of the targets required for positioning end effectors with respect to the component which they are to engage. In the improved satellite servicing system, the remote manipulator system which is normally used for the purpose of capturing and deploying satellites is also used for servicing the satellites when captured and secured for servicing. An improved payload distribution system is provided in the cargo bay which permits optimum utilization of the cargo bay by primary payload units by providing for the location of secondary payload units at any convenient position of opportunity along the length of the cargo bay. In the improved target system, targets are mounted at a site which is remote from the complementary component which is to be engaged by the end effector carried by the manipulator arm such that the target does not permanently obscure the line of vision of the television camera which is mounted on the remote manipulator.

19 Claims, 8 Drawing Figures

SATELLITE SERVICING

This invention relates to The Space Shuttle Orbiter. In particular, this invention relates to an improved satellite servicing system and improvements in the payload distribution in the cargo bay of a Space Shuttle Orbiter.

A satellite servicing system is described in U.S. Pat. No. 4,079,904, dated Mar. 21, 1978. In this known system, the remote manipulator arm which is used for the purposes of capturing and deploying an orbiting satellite is not used for the purposes of exchanging modules between the satellite and the replacement module assembly. The module exchange mechanism of this prior patent is capable of operating independently of the remote manipulator arm. This mechanism has previously been used in conjunction with a relatively large replacement module storage magazine. The module exchange mechanism and replacement module storage magazine are generally housed in the aft section of the cargo bay so that the forward section is available for using in stowing a primary payload assembly such as a satellite, an orbiter probe or the like. The replacement module storage magazine and the module exchange mechanism previously proposed occupied a substantial portion of the cargo bay and thus effectively reduced the payload capacity of the cargo bay. To provide for the most efficient use of the orbiter, it is important to maximize the payload capacity of the cargo bay and to minimize the portion of the cargo bay utilized for the stowing of secondary payload items such as replacement modules and the Module Exchange mechanism for effecting transfer of replacement modules between the replacement module storage device and the satellite which is to be serviced.

It is an object of the present invention to provide an improved satellite servicing system for an orbiter in which the Remote Manipulator System which is normally used for the purpose of capturing and deploying satellites is also used in the servicing of satellites when captured and secured for servicing.

A further object of the present invention is to provide an improved payload distribution system in a cargo bay of an orbiter which permits the optimum utilization of the cargo bay by primary payload units by providing for the location of secondary payload units at a convenient position of opportunity along the length of the cargo bay.

A further object of the present invention is to provide an improved target system for use in a remote manipulator system wherein the target is mounted at a site which is remote from the complementary component which is engaged by the end effector such that the target does not permanently obscure the line of vision of the television camera when the complementary component is removed from its support structure.

SUMMARY OF INVENTION

According to one aspect of the present invention there is provided in a space orbiter having a cargo bay formed therein which has a longitudinal extent in a first direction, said orbiter being adapted to open to provide access to the cargo bay through an access passage extending along said cargo bay in said first direction, an improved satellite servicing system comprising a remote manipulator system which includes a remote manipulator arm having a first end secured to the orbiter and a free end which may be moved in response to manipulation of the arm to be positioned at any required point with a predetermined operational range extending within and without said cargo bay for use in the capturing, deploying and servicing of satellites and the like, a combined satellite service and replacement module support assembly mounted in said cargo bay within said operational range of said arm, said support assembly comprising a support frame mounted in and extending transversely of said cargo bay within said operational range of said arm, a plurality of replacement modules releasably mounted on said support frame in a side-by-side generally planar array, said replacement modules being accessible to and releasable by the free end of said manipulator arm, a satellite servicing platform on said frame, said platform being adapted to support a satellite in a satellite servicing position within said operational range of said manipulator arm whereby the manipulator assembly may be operated to effect an interchange of modules between a satellite located on said platform and modules located on said support assembly.

According to a further aspect of the present invention, there is provided a space orbiter having a cargo bay formed therein which has a longitudinal extent in a first direction, an improved payload distribution system comprising a remote manipulator assembly operable to perform manipulating functions within a predetermined range along the longitudinal extent of the cargo bay, mounting means in said cargo bay and located within at least said operational range of said remote manipulator assembly adapted to operably locate payload assemblies at a plurality of positions along the length of said cargo bay, a first primary payload assembly located in said cargo bay and mounted on said mounting means at a convenient location along the length of said cargo bay to provide a free length of cargo bay at a position of opportunity along the length of said cargo bay, a secondary payload assembly disposed in said free length of said cargo bay and mounted on said mounting means, thereby to permit optimum utilization of said cargo bay.

According to a further aspect of the present invention, there is provided in a remote manipulator system in which a television camera is mounted at the free end of a manipulator arm to relay a target image to a monitor having image alignment markings thereon, the manipulator arm having an end effector located at the free end thereof for use in mounting and releasing a complementary component with respect to a support structure, the improvement of a target mounted at a site remote from said complementary component on the direct line of vision of said camera when said end effector is axially aligned with said complementary component and said complementary component is mounted on said support structure, said target being proportioned such that its image viewed at the monitor is coextensive with the image alignment markings of said monitor when said end effector is operably positioned to mount or release said complementary component with respect to its associated support structure.

PREFERRED EMBODIMENT

The invention will be more clearly understood after reference to the following detailed specification read in conjunction with the drawings, wherein.

Figure 1:
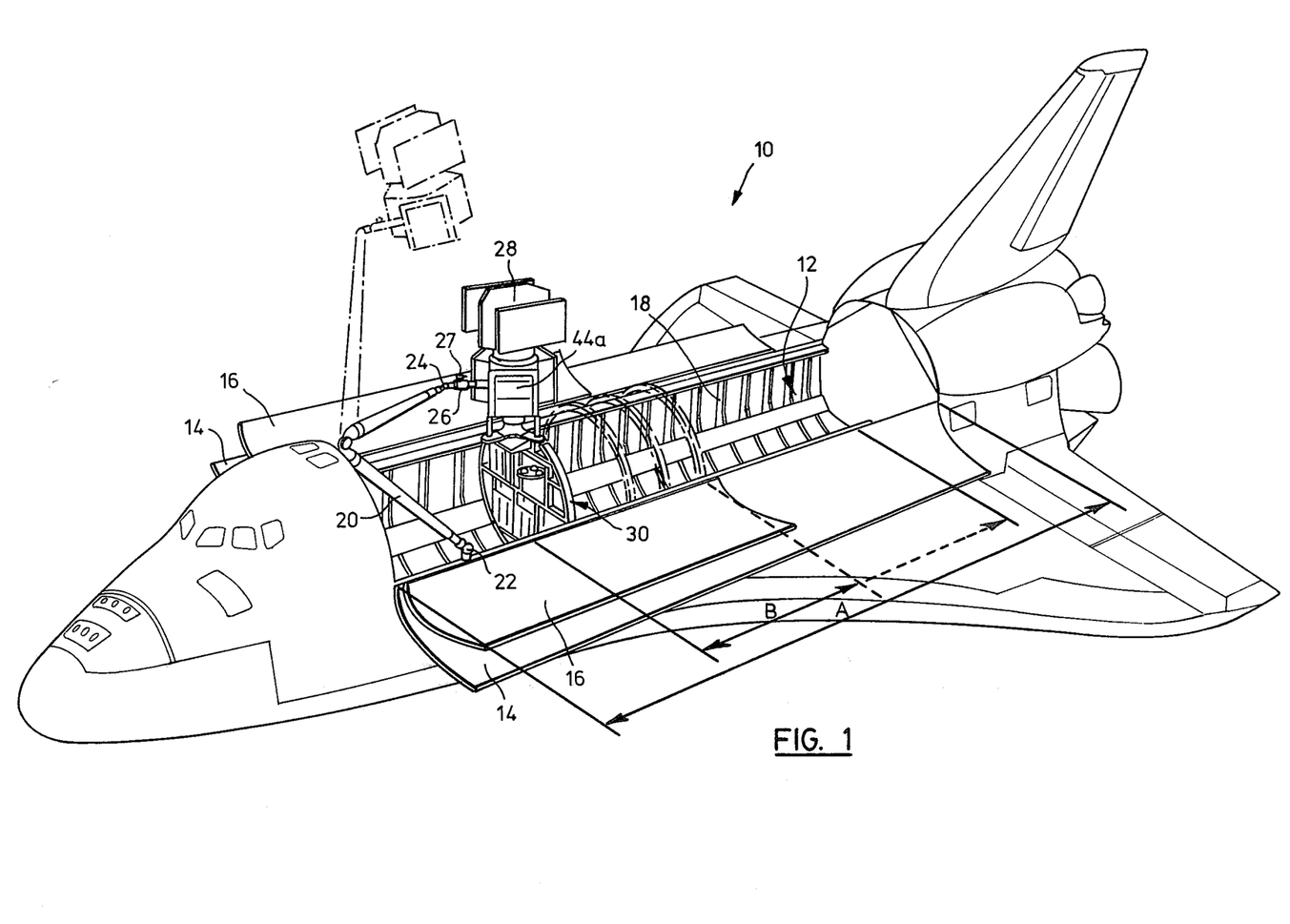
FIG. 1 is a pictorial view of a space orbiter in which the cargo bay is open to illustrate the location of a combined satellite service and replacement module support assembly and a plurality of alternate positions thereof.

With reference to the drawings, reference numeral 10 refers generally to a Space Shuttle Orbiter. The orbiter has a cargo bay generally identified by the reference numeral 12 which, in FIG. 1, is shown in the open position. The manifest bay 12 extends longitudinally of the Space Shuttle Orbiter and has its forward end disposed adjacent the crew compartment of the Shuttle Orbiter which is located in the forward end of the Space Shuttle Orbiter. The Space Shuttle Orbiter has longitudinally extending doors 14 and 16 which are openable to provide access to the cargo bay through an access passage extending along the cargo bay in the direction of its longitudinal extent. The doors 16 and 14 are powered for movement between the open position illustrated in FIG. 1 and the closed position totally enclosing the cargo bay.

As in previously proposed cargo bay constructions, a plurality of trunnion fittings 18 are provided at spaced intervals, generally eighteen inches, along the length of the cargo bay. The support trunnion fittings 18 extend along substantially the full length of the cargo bay and provide payload support means at spaced intervals along the length of the cargo bay for supporting payload units therein.

The Space Shuttle Orbiter 10 is provided with a remote manipulator assembly which includes a remote manipulator arm 20 which has one end mounted by means of a shoulder joint 22 at a predetermined position along the length of one wall of the cargo bay. The arm 20 has a remote manipulator end effector 26 connected to the free end thereof by a wrist joint 24. The remote manipulator end effector 26 has a television camera 27 mounted adjacent thereto. The direct line of vision of the camera 27 is arranged to extend from the focal point of the camera along an axis parallel to the longitudinal axis of the end effector 26. The end effector 26 may be in the form of a grappling device similar to that described in U.S. Pat. No. 4,105,241, Mee et al, dated Aug. 18, 1978. The end effector 26 may be operably secured with respect to a grapple fixture mounted on a satellite or on any one of a number of tools such as module release end effectors. The manipulator arm 20 is capable of operating over a predetermined operational range B extending within the cargo bay and it is capable of operating without the cargo bay for the purposes of capturing or deploying an orbiting satellite generally identified by the reference numeral 28. The overall length A of the cargo bay may be of the order of about sixty feet with the operational range B of the manipulator arm operating in conjunction with the assembly 30 being of the order of about forty feet.

Figure 5:
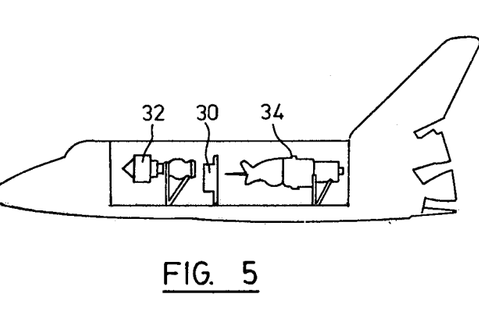
FIG. 5 is a side view of an orbiter illustrating the location of the combined satellite service and replacement module support assembly in a position of opportunity in the cargo bay.

A combined satellite service and replacement module support assembly constructed in accordance with the embodiment of the present invention is generally identified by the reference numeral 30. The assembly 30 may be located at any required position of opportunity along the length of the operational range B, by selecting the most convenient trunnion support 18 for use in supporting the assembly 30. By reason of the fact that the assembly 30 may be positioned on any one of the trunion supports 18, the most convenient trunnion support may be selected to enable the assembly 30 to be located at substantially any required location along the length of the cargo bay. As a result, it is possible to plan the distribution of the primary load based upon the total cargo bag length A and thereafter to locate the assembly 30 at any convenient position of opportunity within the operational range B. It will be understood that the primary payload units are supported by trunnion frames which are in turn mounted on the most conveniently located trunnion fitting 18 to achieve the required load distribution. Thus, as shown in FIG. 5 of the drawings, the assembly 30 may be located between primary payloads 32 and 34. The configuration illustrated in FIG. 5 is a configuration which might conveniently be used in Flight No. 13 of the current shuttle orbiter flight manifest in which the assembly 30 is located between the primary payload unit 32 which is the SSUS-A and primary payload unit 34 which is INTESLAT V.

Figure 6:
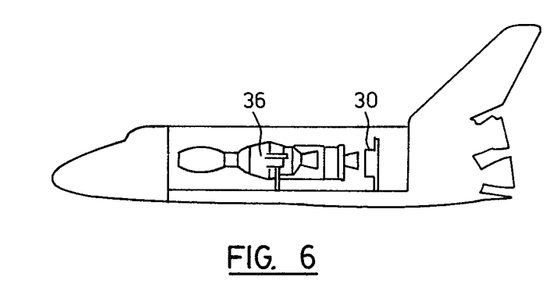
FIG. 6 is a side view of an orbiter similar to FIG. 5 illustrating the location of the combined satellite service and replacement module support assembly in a further position of opportunity in the cargo bay.

FIG. 6 illustrates a different payload distribution in which the assembly 30 is located in the aft section of the cargo bay and the primary payload unit 36 is located in the forward section of the cargo bay. This diagram illustrates a possible payload distribution for use in Flight No. 23 in which the primary payload unit is a Jupiter Orbiter Probe.

It will be understood that the payload distribution system of the present invention is equally applicable to any other space shuttle orbiter flight.

Figure 3:
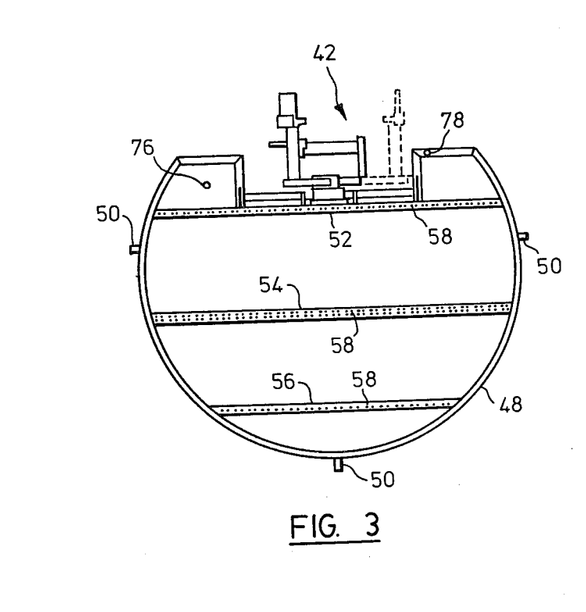
FIG. 3 is a front view of the combined satellite service and replacement module support assembly with the modules and their associated latching frames removed.
Figure 4:
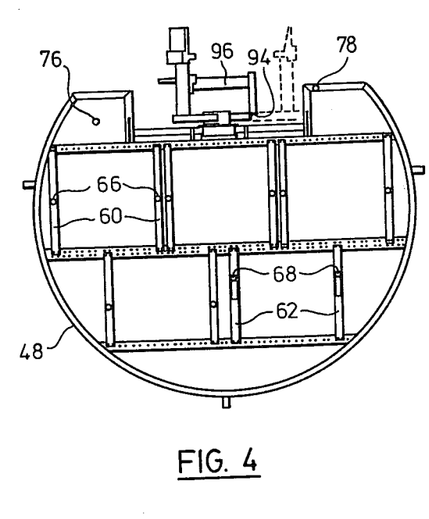
FIG. 4 is a view similar to FIG. 3 illustrating the assembly of FIG. 3 with the module latch frames mounted thereon.

The combined satellite service and replacement module assembly 30 is illustrated in detail in FIGS. 2, 3 and 4 of the drawings to which reference will now be made.

The assembly 30 consists of a support frame generally identified by the reference numeral 40, a satellite servicing platform generally identified by the numeral 42 and a plurality of replacement modules of which two types are identified by the reference numerals 44 and 46, respectively.

The support frame 40 consists of a perimeter member 48 which is proportioned so as to extend in close proximity to the sides of the cargo bay when located therein. The perimeter member 48 has trunnions 50 projecting outwardly therefrom which are adapted to engage the trunnion support frame 18 to support the assembly 30 in a position extending transversely of the longitudinal extent of the cargo bay. Mounting frame members 52, 54 and 56 extend transversely across the perimeter member 48 and are arranged in a spaced parallel relationship one above the other. A plurality of mounting passages 58 are located at spaced intervals along the length of each of the mounting frame members 52, 54, 56. Latching frame members 60 and 62 extend between and are secured to adjacent frame mounting members and are selectively positioned to the proportions required for use in supporting the replacement modules 44 and 46, respectively, by use of the appropriate mounting passages 58, the latching frame members 60 and 62 being bolted to the mounting frame members through the mounting passages 58 and corresponding mounting passages at each end of the latching frame members.

The latching mechanism used for releasably securing the replacement modules with respect to the assembly 30 may be of any convenient latching structure. In one form, the latching mechanism may include latching probe assemblies latching barrel assemblies and latch operated mechanisms of the type described in U.S. Pat. No. 4,079,904. The latching probes are secured with respect to the latching frame members and remain attached to the support assembly 40 after the module has been released. The latching barrels are carried by the replacement modules and the latch operator is an end effector located at the free end of the manipulator arm assembly. In the embodiment illustrated in FIG. 4 of the drawings, latching probes 66 are mounted on the latch frame members 60 and identical latching probe members 68 are mounted on the latching frame members 62. The latching barrels 70 are secured with respect to the replacement modules 44 and identical latching barrels 72 are secured with respect to the replacement module 46. The latch operator mechanism is incorporated in the end effector 74 which, during assent and descent of the Space Shuttle, may be parked on a latching probe 76 of the type previously described which is located on a support plate 75 (FIG. 2). A similar parking latching probe 76 is mounted on the main frame 48 on the opposite side of the satellite support platform 42. Parking latching probe 78 may be used to provide a temporary support for modules which are removed from the satellite which is being serviced so that the manipulator arm may be freed to move a replacement module from the replacement module storage assembly direct to the satellite.

The satellite service platform 42 consists of a turntable, generally identified by the reference numeral 80 which includes a stationary component 82 which is secured with respect to the transversely extending support frame member 86 and a rotating member 88 which is rotatably driven by a suitable drive mechanism (not shown). The rotating member 88 has three arms 92 projecting outwardly therefrom. One or more of the arms 92 may be hingedly connected by means of hinges 94 to the rotating member. The hinges 94 permit the satellite docking platform to assume a compact configuration when not in use such that the overall length thereof is no greater than the length C. The legs or arms of the turntable assembly may also be jettisonable if required.

Visual alignment targets are provided to permit the crew to operably position the end effector 26 or the end effector 26 and an associated end effector 74 with respect to a complementary component such as the barrel 70 which is to be manipulated thereby. An example of one target is the target 100 which is associated with the end effector 74 (FIG. 2). It will be noted that the target mounting site of the target 100 is the support frame assembly 40 and not the end effector 74. Thus, the target 100 is located in a plane which is spaced rearwardly from the interface which will be formed between the end effector 26 and the end effector 74 when operably connected to one another. Similarly, the target 100a is mounted on the support frame 40 in a plane spaced rearwardly from the interface to be formed between the support probe 78 and a replacement module temporarily parked thereon. In a like manner a target 100b is mounted at a site on the support frame 40 so as to be associated with each latching barrel 70.

Figure 7:
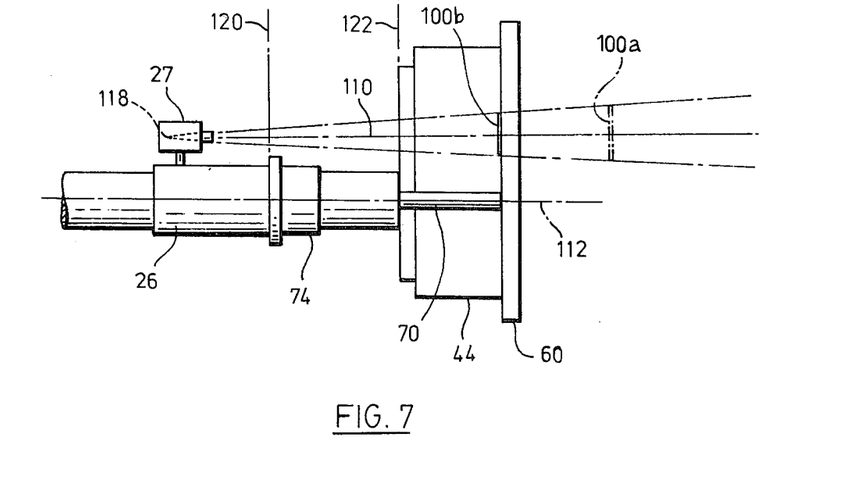
FIG. 7 is a side view of the free end of the manipulator arm showing the manipulator arm end effector and a module interchange end effector mounted thereon with a television camera mounted on the end effector in alignment with a number of potential target mounting sites.

As shown in FIG. 7 of the drawings, the television camera 27 has a direct line of vision extending along the axis 110 in a plane parallel to the longitudinal axis 112 of the remote manipulator end effector 26 on which the camera is mounted.

Figure 8:
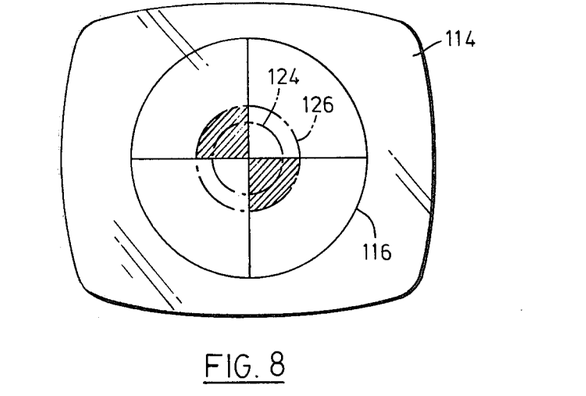
FIG. 8 is a front view of a television monitor illustrating the target alignment technique.

A monitor 114 is located in the crew cabin for use by the crew in monitoring the pictures taken by the camera 27. The monitor 114 has image alignment markings 116 applied directly to the viewing screen thereof. The visual alignment targets are arranged and proportioned so as to be aligned with and coextensive with the image alignment markings when the remote manipulator system is operably positioned with respect to the complementary component associated with the selected visual alignment target. Image outlines 124 and 126 illustrate the progressive increase in size of the target image as the camera advances toward the target.

As shown in FIG. 7 of the drawings, the position of the focal point 118 of the camera is fixed with respect to the plane 120 which is located at the interface formed between the remote manipulator end effector 26 and the module interchange end effector 74 and with respect to the second plane 122 which is located at the interface of the module interchange end effector 74 and its complementary component. Thus, the size of the target required to fully fill the image alignment markings will vary in direct proportion to the distance at which the target is sighted from the focal point of the camera. It follows that it is not necessary to locate the targets in the plane of the various interfaces provided the targets are located on the direct line of vision of the camera and are proportioned to provide an image which is coextensive with the image alignment markings 116 when the required interface connection is established in use. This is an important feature because it permits the visual sight targets to be located at any convenient site remote from and rearwardly from the component which is to be engaged by the manipulator arm in use. Thus, for example, when the end effector 26 is used to engage the end effector 74 the target 100 is used to achieve the required positioning of the manipulator arm assembly. The target 100 remains with the support structure with the result that when the end effector 74 is removed from its parking probe, the direct line of vision of the television camera will not be obstructed by the end effector 74 and the camera may be used to achieve subsequent positioning of the end effector 74 with respect to a complementary module exchange latching barrel.

In use, it is important to achieve maximum utilization of the cargo bay space in order to provide a maximum payload capacity for primary payload units. This desirable objective is achieved in accordance with the present invention by reason of the fact that it is possible to plan the location of one or more primary payload units at appropriate positions in the cargo bay and to locate the secondary payload unit in the form of a replacement module support assembly at any convenient position of opportunity provided by the distribution of the primary payload unit. Having selected the appropriate primary payload and secondary payload distribution, the primary payload items and secondary payload units are located as planned in the cargo bay. The space orbiter may then be launched and made operational to effect deployment of its cargo. The space orbiter may also be manoeuvered to close proximity with an orbiting satellite or the like. The remote manipulator assembly may then be activated to extend the manipulator arm so that its end effector with the aid of suitable visual targets engages a grapple device conveniently located on the satellite. The manipulator arm may then be manipulated to locate the satellite on the satellite servicing platform 42. The satellite platform 42 may be rotated so that the modules 44 are directed in the general direction of the crew compartment of the space orbiter so as to be visible through observation windows which permit viewing from the crew compartment into the cargo bay. The crew then manoeuvers the remote manipulator system to pick up the module exchange end effector 74 using the visual target 100. The manipulator arm with the module exchange end effector 74 located thereon is manoeuvered to engage the module release latch mechanisms to release a module 44a mounted in the satellite. The module 44a is then transferred by the manipulator arm to the parking latch 78. A replacement module 44a is then removed from the replacement module support assembly and located in the compartment which was vacated by the module 44a. Thereafter the module 44a is removed from the parking latch 78 and mounted on support frame at the position vacated by the replacement module. This process may be repeated until all of the required modules have been interchanged.

Figure 2:
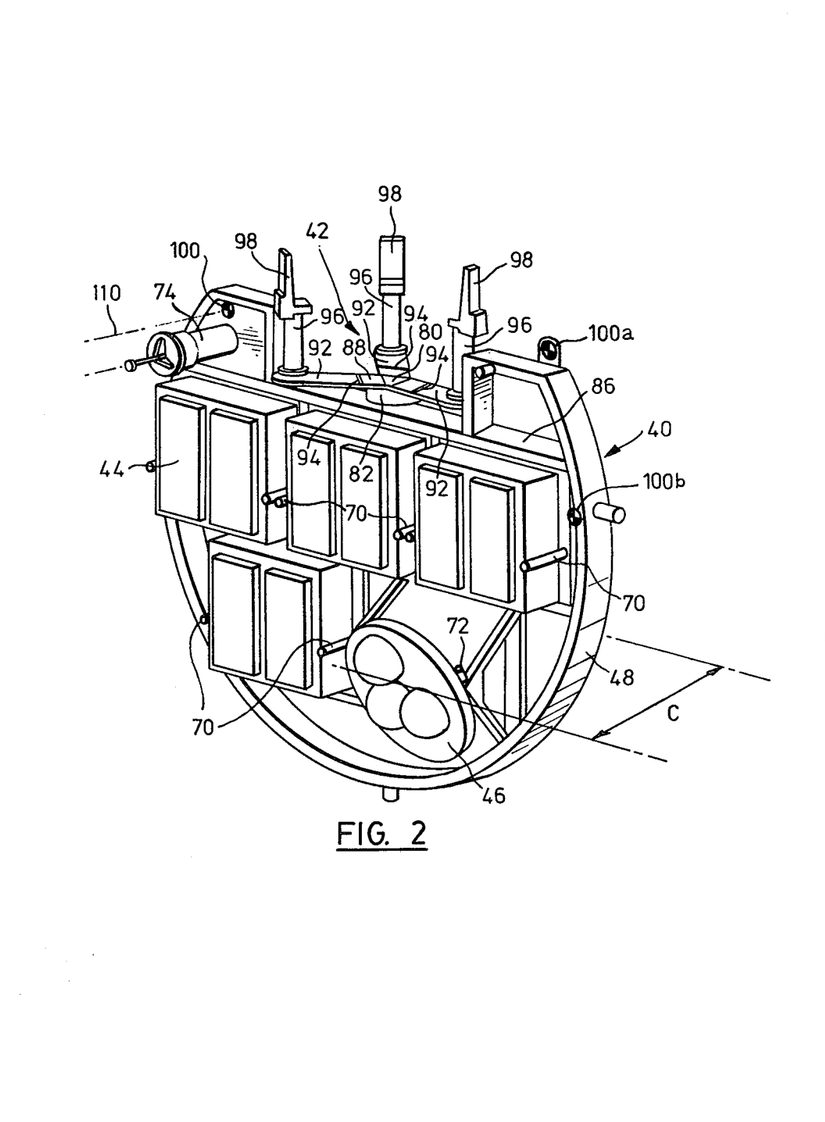
FIG. 2 is a pictorial view of the combined satellite service and replacement module support assembly of FIG. 1 in enlarged detail.

As shown in FIG. 2 of the drawings and as previously indicated, one of the replacement modules may be in the form of a propulsion module 46. In order to support the propulsion module in the position to facilitate the manipulation thereof, a special purpose support frame is required. The special purpose support frame is readily mounted on the previously described main support frame and serves to locate the replacement modules in a position in which the latching mechanism are readily accessible to the end effector.

It will be noted that the combined satellite service and replacement modules support assembly of the present invention can be positioned in the cargo bay with the replacement modules mounted on the base thereof which is directed toward the forward end of the cargo bay with the result that the modules and their supporting latch mechanisms are readily visible from the cargo bay. This permits the crew operator to observe the manipulations of the remote manipulator mechanism as it effects latching, unlatching and transfer of the modules between the satellite service and replacement modules support assembly and a satellite mounted on the support platform in use.

Various modifications of the structure of the present invention will be apparent to those skilled in the art without departing from the scope of the invention. For example, the distribution and proportions in the various modules which are mounted on the replacement modules support may vary as required in use. This may be achieved by adjusting the position of the mounting frame members or the latching frame members of the module support assembly.

As previously indicated, the latching mechanism used for releasably securing the replacement modules and the end effector used in conjunction therewith may be of any convenient latching structure. In one such proposal, a threaded latching pin is mounted on the latching frame members and projects outwardly therefrom. A latching nut is rotatably mounted in the replacement modules for engaging the threaded pin and an extending assembly is provided for extending the overall length of the nut to the front face of the replacement module. In this embodiment, the end effector 74 would incorporate a rotatably driven tool adapted to engage the extending assemblies of the latching nut so as to rotatably drive the latching nuts to engage or release the threaded latching pins. These and other modifications will be apparent to those skilled in the art.

What I claim as my invention is:

1. In a space shuttle orbiter having a cargo bay formed therein which has a longitudinal extent in a first direction, said orbiter being adapted to open to provide access to the cargo bay through an access passage extending along said cargo bay in said first direction, an improved satellite servicing system comprising:
   (a) a remote manipulator assembly which includes a remote manipulator arm having a first end secured to the orbiter and a free end which may be moved in response to manipulation of the arm to be positioned at any required point with a predetermined operational range extending within and without said cargo bay for use in the capturing, deploying and servicing of satellites and the like,
   (b) a combined satellite service and replacement module support assembly mounted in said cargo bay within said operational range of said arm, said support assembly comprising:
      (i) a short generally planar support frame mounted in and extending transversely of said cargo bay within said operational range of said arm, said support frame having a support face extending transversely of said cargo bay on the side of the frame proximate said first end of said manipulator arm,
      (ii) a plurality of replacement modules releasably mounted on said support face of said support frame in a side-by-side generally planar array, said replacement modules being accessible to and releasable by the free end of said manipulator arm,
      (iii) a satellite servicing platform on said frame, said platform being adapted to support a satellite in a satellite service position within said operational range of said manipulator arm whereby the manipulator assembly may be operated to affect an interchange of modules between a satellite located on said platform and modules located on said support assembly.

2. A space shuttle orbiter as claimed in claim 1 further comprising:
   payload support means located along the length of said cargo bay for supporting one or more primary payload units on said support assembly at any one of a number of positions along the length thereof whereby said support assembly may be located at any required position of opportunity along the length of the cargo bay within said operational range to permit maximum utilization of the cargo bay by the primary payload units.

3. A space shuttle orbiter as claimed in claim 2 having a crew compartment at one end of the longitudinal extent of the cargo bay and wherein said support frame has a support face on which replacement modules are mounted, said support face being directed toward said crew compartment so as to be directly visible therefrom.

4. A space shuttle orbiter as claimed in claim 1 wherein said cargo bay has a predetermined payload envelope when closed, said combined satellite and replacement module support assembly being proportioned to be accommodated entirely within said payload envelope when located in said cargo bay, with the result that there is no need to make provision for jettisoning the support assembly in use.

5. A space shuttle orbiter as claimed in claim 2 wherein said support frame comprises a perimeter member extending in close proximity to the adjacent sides of said cargo bay and a plurality of mounting frame members extending across the perimeter member, a plurality of mounting passages formed in the mounting frame members at spaced intervals along the length thereof, a plurality of latching frame members each having releasable latching means thereon adapted to engage and releasably secure said replacement modules, said latching frame members being selectively mountable on said mounting frame member at any required position thereon by selective engagement with said mounting passages so as to arrange said releasable latch means in any required configuration to accommodate replacement modules of various configurations.

6. A space shuttle orbiter as claimed in claim 5 wherein said mounting frame members extend transversely across the perimeter member in a spaced parallel relationship and said latching frame members extend between adjacent mounting frame members in a spaced parallel relationship such that the support frame is generally planar and occupies a minimal amount of the longitudinal extent of the cargo bay payload area.

7. A space shuttle orbiter as claimed in claim 6 wherein said support frame has an upper end arranged to be disposed at said access passage, said mounting frame member including an uppermost mounting frame member disposed adjacent the upper end of said support frame, said satellite servicing platform being mounted on said uppermost mounting frame member and extending upwardly therefrom.

8. A space shuttle orbiter as claimed in claim 7 wherein said satellite servicing platform comprises a turntable having a fixed component secured with respect to said uppermost mounting frame member and a movable component drivingly mounted on said fixed component for rotation relative thereto about an axis extending outwardly from the support member through said access passage.

9. A space shuttle orbiter as claimed in claim 8 wherein the turntable further comprises a plurality of satellite supporting arms mounted on said movble component, said arms being mounted for movement relative to said movable component between a compact stowed configuration in which they are arranged in a generally transverse planar configuration extending parallel to the support frame and a deployed configuration for receiving and retaining a satellite in said servicing position.

10. A space shuttle orbiter as claimed in claim 5 including parking latch means mounted on said support frame outwardly from the space provided to accommodate the array of replacement modules whereby a module removed from a satellite may be parked on the support frame until a replacement module stowage space is vacated on the support frame.

11. A space shuttle orbiter as claimed in claim 5 including module interchange end effector parking means on said support frame outwardly from the space provided to accommodate the array of replacement modules whereby a module interchange end effector may be parked on the support frame to be engageable by the free end of the manipulator arm as required in use.

12. In a space shuttle orbiter having a cargo bay formed therein which has a longitudinal extent in a first direction, said orbiter being adapted to open to provide access to the cargo bay through an access passage extending along said cargo bay in said first direction, an improved satellite servicing system comprising:
  (a) a remote manipulator assembly which includes a remote manipulator arm having a first end secured to the orbiter and a free end which may be moved in response to manipulation of the arm to be positioned at any required point with a predetermined operational range extending within and without said cargo bay for use in the capturing, deploying and servicing of satellites and the like,
  (b) a combined satellite service and replacement module support assembly mounted in said cargo bay within said operational range of said arm, said support assembly comprising:
    (i) a support frame mounted in and extending transversely of said cargo bay within said operational range of said arm,
    (ii) a plurality of replacement modules releasably mounted on said support frame in a side-by-side generally planar array, said replacement modules being accessible to and releasable by the free end of said manipulator arm,
    (iii) a satellite servicing platform on said frame, said platform being adapted to support a satellite in a satellite service position within said operational range of said maniplator arm whereby the manipulator assembly may be operated to affect an interchange of modules between a satellite located on said platform and modules located on said support assembly,
  (c) payload support means located along the length of said cargo bay for supporting one or more primary payload units on said support assembly at any one of a number of positions along the length thereof whereby said support assembly may be located at any required position of opportunity along the length of the cargo bay within said operational range to permit maximum utilization of the cargo bay by the primary payload units,
  (d) a crew compartment at one end of the longitudinal extent of the cargo bay and wherein said support frame has a support face on which replacement modules are mounted, said support face being directed toward said crew compartment so as to be directly visible therefrom.

13. In a space shuttle orbiter having a cargo bay formed therein which has a longitudinal extent in a first direction, said orbiter being adapted to open to provide access to the cargo bay through an access passage extending along said cargo bay in said first direction, an improved satellite servicing system comprising:
  (a) a remote manipulator assembly which includes a remote manipulator arm having a first end secured to the orbiter and a free end which may be moved in response to manipulation of the arm to be positioned at any required point with a predetermined operational range extending within and without said cargo bay for use in the capturing, deploying and servicing of satellites and the like,
  (b) a combined satellite service and replacement module support assembly mounted in said cargo bay within said operational range of said arm, said support assembly comprising:
(i) a support frame mounted in and extending transversely of said cargo bay within said operational range of said arm,
(ii) a plurality of replacement modules releasably mounted on said support frame in a side-by-side generally planar array, said replacement modules being accessible to and releasable by the free end of said manipulator arm,
(iii) a satellite servicing platform on said frame, said platform being adapted to support a satellite in a satellite service position within said operational range of said manipulator arm whereby the manipulator assembly may be operated to affect an interchange of modules between a satellite located on said platform and modules located on said suoport assembly,
(c) payload support means located along the length of said cargo bay for supporting one or more primary payload units on said support assembly at any one of a number of positions along the length thereof whereby said support assembly may be located at any required position of opportunity along the length of the cargo bay within said operational range to permit maximum utilization of the cargo bay by the primary payload units,
(d) said support frame comprises a perimeter member extending in close proximity to the adjacent sides of said cargo bay and a plurality of mounting frame members extending across the perimeter member, a plurality of mounting passages formed in the mounting frame members at spaced intervals along the length thereof, a plurality of latching frame members each having releasable latching means thereon adapted to engage and releasably secure said replacement modules, said latching frame members being selectively mountable on said mounting frame member at any required position thereon by selective engagement with said mounting passages so as to arrange said releasable latch means in any required configuration to accommodate replacement modules of various configurations.

14. A space shuttle orbiter as claimed in claim 13 wherein said mounting frame members extend transversely across the perimeter member in a spaced parallel relationship and said latching frame members extend between adjacent mounting frame members in a spaced parallel relationship such that the support frame is generally planar and occupies a minimal amount of the longitudinal extent of the cargo bay payload area.

15. A space shuttle orbiter as claimed in claim 14 wherein said support frame has an upper end arranged to be disposed at said access passage, said mounting frame members including an uppermost mounting frame member disposed adjacent the upper end of said support frame, said satellite servicing platform being mounted on said uppermost frame member and extending upwardly therefrom.

16. A space shuttle orbiter as claimed in claim 15 wherein said satellite servicing platform comprises a turntable having a fixed component secured with respect to said uppermost mounting frame member and a movable component drivingly mounted on said fixed component for rotation relative thereto about an axis extending outwardly from the support member through said access passage.

17. A space shuttle orbiter as claimed in claim 16 wherein the turntable further comprises a plurality of satellite supporting arms mounted on said movable component, said arms being mounted for movement relative to said movable component between a compact stowed configuration in which they are arranged in a generally transverse planar configuration extending parallel to the support frame and a deployed configuration for receiving and retaining a satellite in said servicing position.

18. A space shuttle orbiter as claimed in claim 13 including parking latch means mounted on said support frame outwardly from the space provided to accommodate the array of replacement modules whereby a module removed from a satellite may be parked on the support frame until a replacement module stowage space is vacated on the support frame.

19. A space shuttle orbiter as claimed in claim 13 including module interchange end effector parking means on said support frame outwardly from the space provided to accommodate the array of replacement modules whereby a module interchange end effector may be parked on the support frame to be engageable by the free end of the manipulator arm as required in use.

* * * * *